United States Patent [19]

Kishi et al.

[11] 4,176,607
[45] Dec. 4, 1979

[54] ROCKET SHELL

[75] Inventors: Kazuo Kishi, Himeji; Minoru Hayashi, Tatsuno; Kazuo Naganuma, Himeji, all of Japan

[73] Assignee: Daicel LTD., Osaka, Japan

[21] Appl. No.: 829,511

[22] Filed: Aug. 31, 1977

[30] Foreign Application Priority Data

Sep. 3, 1976 [JP] Japan .................................. 51/105495

[51] Int. Cl.² ............................................... F02K 9/00
[52] U.S. Cl. ................................ 102/49.3; 60/200 A; 220/3
[58] Field of Search .................... 102/49.3; 60/200 R, 60/200 A, 253–256; 220/3

[56] References Cited

U.S. PATENT DOCUMENTS

| 2,744,043 | 5/1956 | Ramberg | 60/200 R |
| 2,848,133 | 8/1958 | Ramberg | 60/200 A |
| 3,092,961 | 6/1963 | Dobell | 60/271 |

FOREIGN PATENT DOCUMENTS 1368951  10/1974  United Kingdom .................. 60/200 A Primary Examiner—Verlin R. Pendegrass
Attorney, Agent, or Firm—Blanchard, Flynn, Thiel, Boutell & Tanis

[57] ABSTRACT

A cylindrical shell for a rocket motor is prepared by rolling up a thin, high tensile strength metal sheet and an adhesive to form a multi-layer cylindrical inner metal shell, winding on said metal shell filaments having a high tensile strength and adhesive to form an outer cylindrical shell and then curing said adhesives to form a unitary structure.

5 Claims, 4 Drawing Figures

ROCKET SHELL

BACKGROUND OF THE INVENTION

1. Field of the Invention

The present invention relates to a rocket shell which is composed of a composite material and has a much improved flight characteristic.

2. Description of the Prior Art

Materials that are used for the production of rocket shells are required to have light weight, high air tightness and sufficient strength. As materials meeting these requirements, there have heretofore been used high tensile strength steels, titanium alloys, aluminum alloys and magnesium alloys. In rocket shells made from these materials, taking into due consideration the burning pressure the metal thickness can be reduced to about 1 mm so as to lighten the weight and/or enhance the mass ratio of the rocket propellent. However, sophisticatd technology is required for production of rocket shells composed of such materials, and they are expensive and are not suitable for mass production.

As rocket shells having a light weight and which are suitable for mass production, there have been proposed rocket shells formed by rolling up in thin plate of a metal into a cylinder by using an adhesive and rocket shells formed by winding high tensile strength filaments into a cylinder by using an adhesive. However, in rocket shells of the former type, because thin metal plates having both a low density and a high tensile strength have not been obtained, in order to obtain a rocket shell having a sufficient tensile strength, the number of laminations or layers must be increased, and, as a consequence, the weight is inevitably increased. Rocket shells of the latter type are satisfactory in density and tensile strength, but they sill possess disadvantages such as insufficient air tightness. Rockets having fully satisfactory properties cannot be obtained using these two types of shells.

As a result of our research works made with a view to overcoming these defects based on rocket shells obtained by laminating a high tensile strength metal thin plate by a combustible adhesive, which are disclosed in Japanese Patent Application Laid-Open Specification No. 2200/76 and the specification of Japanese Patent Application No. 7607/75 (corresponding to U.S. Ser. No. 628,503, filed Nov. 3, 1975) now abandoned, replaced by continuation application Ser. No. 848 740, filed Nov. 4, 1977, now U.S. Pat. No. 4,119,036, we discovered that a rocket shell, formed by laminating in combination a high tensile strength metal thin plate and filaments having a high tensile strength by using an adhesive, has a low density and a high tensile strength and can improve the properties of the resulting rocket. Based on this finding, we have now completed the present invention. The rocket shell of the present invention has a strength that can sufficiently withstand the conventional combustion pressure of a rocket (20 to 100 Kg/cm$^2$), it is excellent in air tightness, and is very light in weight.

In structures composed of composite materials, such as the rocket shell of the present invention, when a plurality of structural materials (principal strength-imparting materials) are employed, it is desired that they be quite similar to one another with respect to physical properties such as elongation and modulus of elasticity. More specifically, if there are large differences between the physical properties of these materials, when a force is applied to the structure, a stress is generated mainly on the material having the lowest elongation, and a sufficient strength cannot be manifested by the structure of composite materials taken as a whole. Accordingly, the respective materials should be selected taking this into due consideration.

In the present invention, the structural materials of the rocket shell are a high tensile strength metal thin plate (hereinafter referred to as "thin metal plate"), preferably having a thickness of from 0.02 mm to 1.0 mm, and high tensile strength filaments (hereinafter referred to as "filaments"). As the former structural material, there are used materials customarily used for the production of rocket shells, for example, high tensile strength steels, precipitation hardened stainless steel, and titanium alloys, and as the latter structural material, there are used glass fibers, carbon fibers, organic fibers such as aromatic polyamides and metal fibers such as piano wire. In order to enhance the strength of the entire structure of the composite materials, it is especially preferred and advantageous to use organic fibers, carbon fibers or piano wires having a tensile strength of at least 250 Kg/cm$^2$ as the filaments.

As the adhesive that is used in the present invention, there are used organic adhesives such as epoxy resins, polyurethane resins and phenolic resins. The adhesive cannot be regarded as a structural material, but it is preferred to use an adhesive having a composition which possesses excellent adhesiveness and heat resistance.

Figure 1:
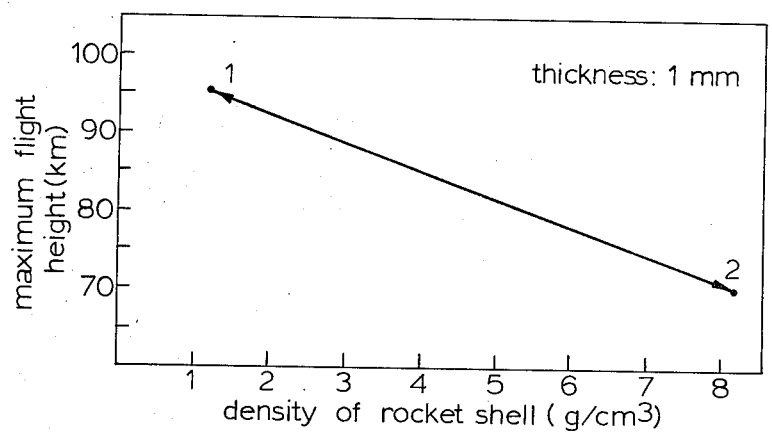
FIG. 1 illustrates the relation between the maximum flight height achieved and the density of the rocket shell (hereinafter referred to as "density"), observed when the thickness of the rocket shell (hereinafter referred to as "thickness") is maintained constant at 1 mm.

A first advantage of the present invention is that the specific strength of the composite (the value obtained by dividing the strength by the specific gravity) is high, namely the strength is high and the weight is low. The weight of the rocket shell is one of the important elements that has a great influence of the flight characteristics of a rocket. When the relation between the maximum flight height and the density is calculated in the same time-thrust relation of a certain model rocket, a curve as shown in FIG. 1 is obtained. The values at both the terminal ends 1 and 2 of the curve are those values determined wit respect of a rocket shell made of a Kevlar fiber (aromatic polyamide made by Du Pont) reinforced plastic (FRP) material alone and a thin metal plate alone, respectively, and the values at intermediate points are those determined with respect to composite materials composed of both the FRP material and the metal plate.

Figure 2:
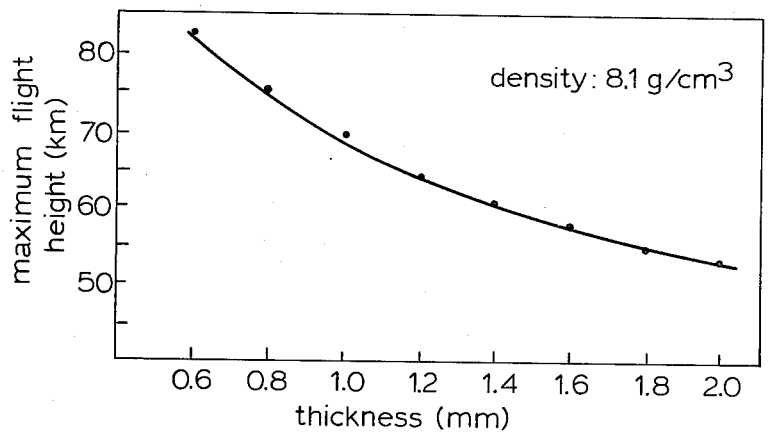
FIG. 2 illustrates the relation between the maximum flight height and the thickness, observed when the density of the shell material is maintained constant at 8.1 g/cm$^3$.

When the relation between the thickness of the rocket shell and the maximum flight height, observed when the shell thickness is changed in the same material, is calculated, a curve as shown in FIG. 2 is obtained.

Figure 3:
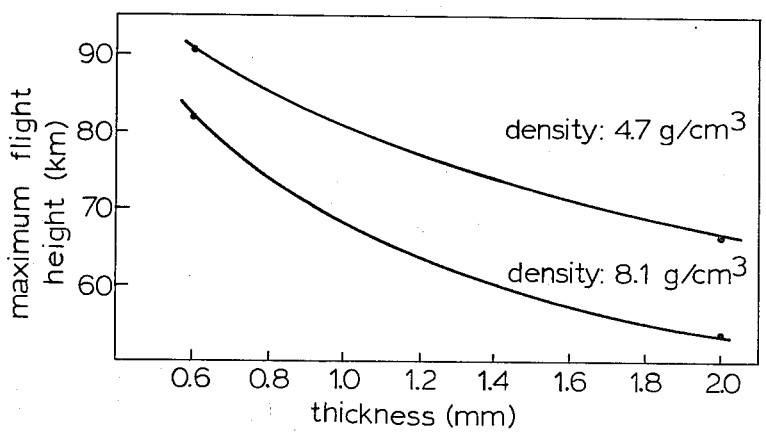
FIG. 3 illustrates the relation between the maximum flight height and the thickness, observed when the density of the shell material is 4.7 and 8.1 g/cm$^3$, respectively.

In conventional rocket shell materials, the tensile strength is about 200 Kg/mm$^2$ at the highest, and the specific strength is about $2.47 \times 10^6$ cm. On the other hand, as will be apparent from the Examples given hereinafter, in the rocket shell of the present invention, the tensile strength is higher than 180 Kg/mm$^2$ and the specific strength is higher than $4.36 \times 10^6$ cm. Further, in the rocket shell of the present invention, it is readily possible to increase the tensile strength to the highest level (200 Kg/mm$^2$ at a thickness of 0.68 mm) achieved in conventional high tensile strength steel rocket shells. Moreover, it was found that when the rocket shell of the present invention is used, because the density of the shell is low, the flight characteristics of the rocket can be further improved. An example of the calculation is shown in FIG. 3.

A second advantage of the present invention is that although the rocket shell is formed of a composite material, a good air tightness is attained.

Pressure vessels formed by using resins including filaments as a structural material have a sufficient strength, but the air tightness is low and they are not suitable as pressure-resistant vessels for practical use. However, in the rocket shell of the present invention, because a high tensile strength metal thin plate is used at a structural material, a sufficient air tightness can be attained, and at the hydraulic test, water leakage does not occur at all.

A third advantage of the present invention is that the rocket shell of the present invention is very suitable for mass production. In the present invention, the rocket shell comprising the above-mentioned structural materials can easily be prepared by rolling up and laminating a thin metal plate, by itself, in a predetermined number of turns to form a multi-layer metal cylinder by using an adhesive between the layers and then winding adhesive-impregnated filaments on the resulting metal cylinder or by laminating the metal plate and filaments as alternating layers. The rocket shell of the present invention can be prepared without performing welding or machining requiring sophisticated technology. Moreover, the lamination ratio of the thin metal plate and the filaments is not critical in the present invention, provided that at least one layer of the thin metal plate is wound as the innermost layer of the rocket shell, and the lamination mode can freely be chosen depending on the desired stength. Still further, the filament-winding method is not particularly critical, and conventional filament-winding methods such as the crosss winding method and the spiral winding method can be utilized. Accordingly, the rocket whell of the present invention can be manufactured with ease at low cost.

In order to roll up a thin, high tensile strength metal sheet, in case that the width of the sheet is larger than that of a rocket shell to be designed, the cross winding method can be utilized. In case that that is otherwise smaller than this, the spiral winding method can be utilized, or several sheets are connected with each other by welding or adhesion and the obtained, wide sheet can be rolled up with the cross winding method.

Figure 4:
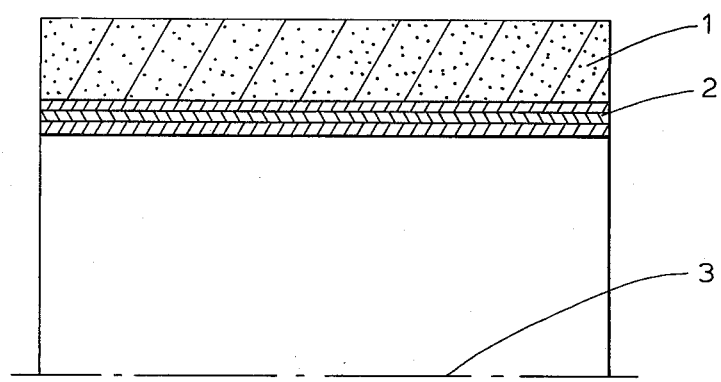
FIG. 4 is a partial sectional view showing the cross-section of the rocket shell of the present invention.

A part of the section of the laminate structure of an example of the rocket shell of the present invention in a direction perpendicular to the axial direction is shown in FIG. 4. In FIG. 4, reference numeral 1 represents an outer filament layer and reference numeral 2 represents an inner cylinder comprised of a plurality of thin metal layers. Reference numeral 3 represents the central longitudinal axis of the rocket shell.

In the case of conventional rocket shells, sophisticated technology is required to obtain a shell in which the thickness of a high tensile strength steel is about 1 mm, and the product is very expensive.

The present invention will now be described by reference to the following illustrative Examples.

EXAMPLE 1

A high tensile strength steel thin plate having a thickness of about 50μ (KMS 18-20, tensile stength=200 Kg/cm$^2$) was continuously rolled up to form a cylinder consisting of three layers of said plate by using an epoxy resin (Epon 828) as an adhesive, between the metal layers, and then organic fibers (Kevlar-49, 4560 denier, filament number=3072) impregnated with an epoxy resin (Epon 828) were continuously wound on and laminated on the resulting metal cylinder at a rate of 8 turns of said filament per 10 mm length of the cylinder. The resulting assembly was heated at 120° C. for 24 hours to cure the adhesive. The inner diameter of the resulting cylinder was 135 mm and the thickness was 0.70 mm. The density was 4.7 g/cm$^3$. A ring having a width of about 10 mm was cut off from the resulting cylinder and was subjected to a tensile test using an Instron tension tester (manufactued by Shimazu Seisakusho). The tensile strength was 195.6 Kg/mm$^2$.

EXAMPLE 2

A cylinder having an inner diameter of 135 mm, a thickness of 0.69 mm and a length of 250 mm was prepared in the same manner as described in Example 1, and the resulting cylinder was subjected to a hydraulic test. The cylinder was broken under an inner pressure of 192 Kg/cm$^2$. No water leakage was caused until the cylinder was broken.

The embodiments of the invention in which an exclusive property or privilege is claimed are defined as follows:

1. A cylindrical rocket shell prepared by rolling up a plurality of turns of a thin sheet of high tensile strength precipitation hardened stainless steel with an organic thermosetting adhesive being disposed between said turns whereby to form an inner cylinder, then winding on the outer surface of said inner cylinder filaments having a high tensile strength and an organic thermosetting adhesive whereby to form an outer cylinder, said filaments being selected from the group consisting of carbon fibers and organic polyamide filaments, and then curing said adhesives to form a unitary cylindrical structure consisting essentially of said inner cylinder united to said outer cylinder.

2. A rocket shell as set forth in claim 1 wherein the high tensile strength precipitation hardened stainless steel sheet has a thickness of from 0.02 mm to 1.0 mm.

3. A rocket shell as set forth in claim 1 wherein the adhesive is a polyurethane resin, an epoxy resin or a phenolic resin.

4. A composite, cylindrical, rocket shell prepared by rolling up a plurality of turns of a thin sheet of high tensile strength precipitation hardened stainless steel with an adhesive being disposed between said turns whereby to form a laminated, multilayer, inner cylinder, said sheet having a thickness of from 0.02 to 1.0 mm, said adhesive being selected from the group consisting of epoxy resins, polyurethane resins and phenolic resins; then winding on the outer surface of said inner cylinder filaments having a high tensile strength and impregnated with said adhesive whereby to form an outer cylinder, said filaments being selected from the group consisting of carbon fibers and organic polyamide filaments, said filaments having a tensile strength of at least 250 Kg/cm$^2$; and then curing said adhesives to form a unitary cylindrical structure consisting essentially of said inner cylinder united to said outer cylinder, said rocket shell having a tensile strength of higher than 180 Kg/mm and having a specific strength of higher than $4.36 \times 10^6$ cm wherein specific strength is equal to tensile strenth divided by the density, said rocket shell being air-tight.

5. A rocket shell as claimed in claim 4 in which the wall thickness of said shell is from about 0.6 to 2.0 mm.

* * * * *